United States Patent
Anderson

(10) Patent No.: US 9,591,873 B2
(45) Date of Patent: *Mar. 14, 2017

(54) DT VAPOR WASH

(71) Applicant: Crown Iron Works Company, Roseville, MN (US)

(72) Inventor: George E. Anderson, Champlin, MN (US)

(73) Assignee: Crown Iron Works Company, Roseville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/753,605

(22) Filed: Jun. 29, 2015

(65) Prior Publication Data

US 2015/0374027 A1 Dec. 31, 2015

Related U.S. Application Data

(63) Continuation of application No. 13/570,854, filed on Aug. 9, 2012, now Pat. No. 9,067,162.

(51) Int. Cl.
| | | |
|---|---|---|
| F26B 25/00 | (2006.01) | |
| A23N 12/08 | (2006.01) | |
| B01D 47/06 | (2006.01) | |
| A23N 12/12 | (2006.01) | |

(52) U.S. Cl.
CPC .......... *A23N 12/08* (2013.01); *A23N 12/125* (2013.01); *B01D 47/06* (2013.01); *F26B 25/005* (2013.01)

(58) Field of Classification Search
CPC ..... A23N 12/08; A23N 12/125; F26B 25/005; B01D 47/06
See application file for complete search history.

(56) References Cited

U.S. PATENT DOCUMENTS

| | | |
|---|---|---|
| 2,695,459 A | 11/1954 | Hutchins |
| 4,376,073 A | 3/1983 | Farmer |
| 5,992,050 A | 11/1999 | Kemper et al. |
| 9,067,162 B2 * | 6/2015 | Anderson ............ A23N 12/08 |
| 2010/0115789 A1 | 5/2010 | Lehmann |

FOREIGN PATENT DOCUMENTS

WO WO-2010141053 A1 12/2010

OTHER PUBLICATIONS

Kingsbaker, Solvent Extraction Techniques for Soybeans and Other Seeds: Desolventising and Toasting, Jour. of the Am. Oil Chemists' Society, vol. 47, No. 10, Jan. 10, 1970.
Gaiser, Markus, Extended European Search Report pursuant to Rule 62 EPC for EP Appl. No. 12180097.3, Dec. 11, 2012.
The State Intellectual Property Office of the People's Republic of China, Notice of First Office Action, Chinese Patent Application No. 201210346464.9, May 12, 2015.

* cited by examiner

*Primary Examiner* — Jiping Lu
(74) *Attorney, Agent, or Firm* — Fredrikson & Byron, P.A.

(57) ABSTRACT

An agricultural product treatment system. A preferred embodiment of the invention includes a truncated conical section which has a small diameter at one end in fluid communication with a conduit array conveying particulate matter from the DT. An open large diameter end of the structure is axially coextensive and coaxial with an expanded diameter conduit portion.

6 Claims, 1 Drawing Sheet

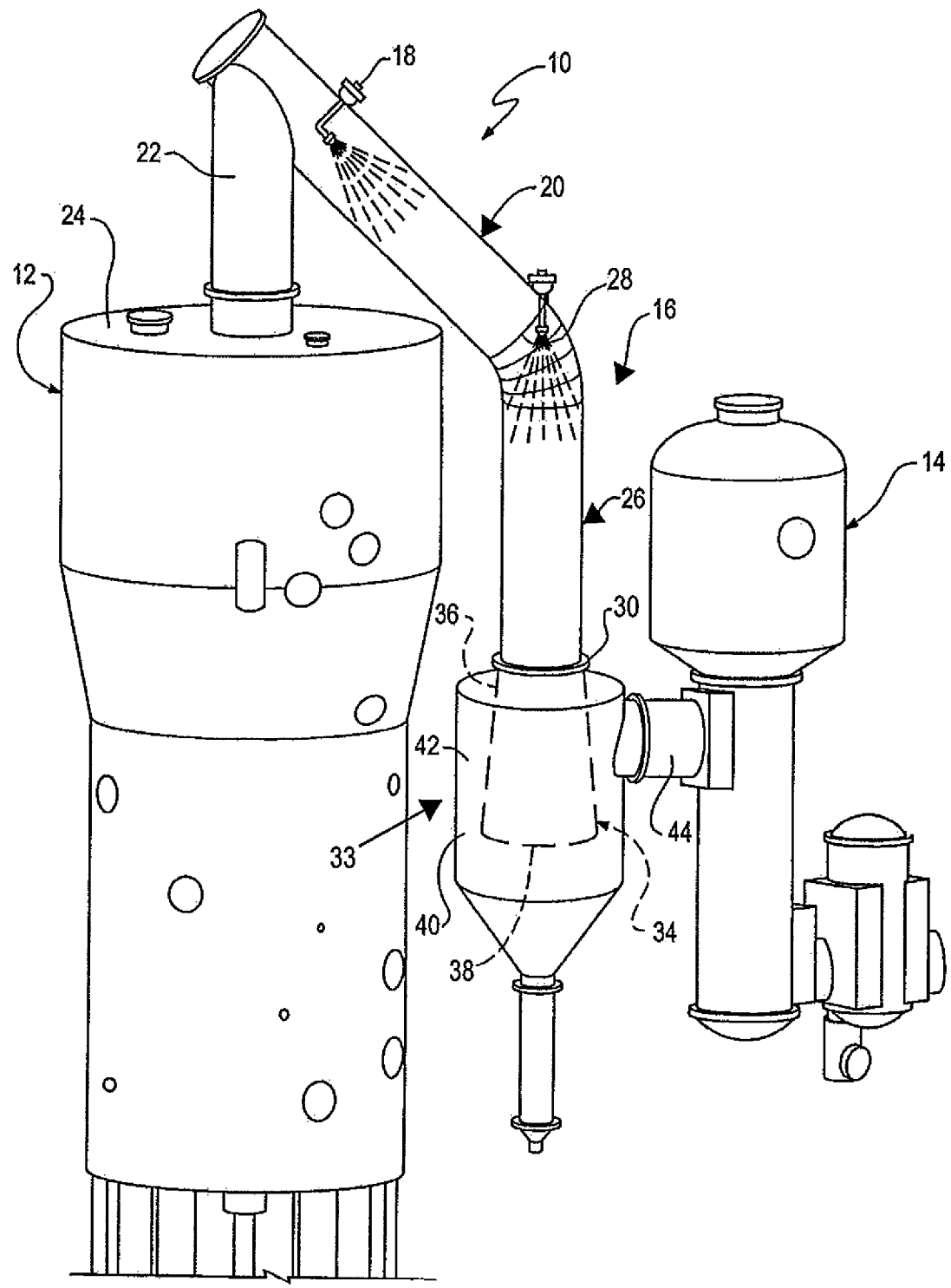

DT VAPOR WASH

CROSS-REFERENCE TO RELATED APPLICATIONS

This is a regular application filed under 35 U.S.C. §111(a) claiming priority, under 35 U.S.C. §119(e)(1), of provisional application Ser. No. 61/521,995, previously filed Aug. 10, 2011, under 35 U.S.C. §111(b).

TECHNICAL FIELD

The present invention is an apparatus for cleaning vapors generated within a desolventizer/toaster (DT) of particulate matter entrained within the vapors and before the vapors are conveyed by conduit to an evaporator. The structure employs unique components interposed between the DT and a down flow evaporator. It is able to achieve a high level of efficiency because of the unique structure.

BACKGROUND OF THE INVENTION

The present invention has, as a goal, the scrubbing or cleaning of vapors from a DT. Particulate matter such as dust is precipitated out of the vapors so that the dust is not ingested into an evaporator used in a processing system. Various attempts have been made to provide solutions to problems dealing with cleaning such vapors. One such attempt has been to employ a cyclone on top of the DT. Such a solution has, however, proven expensive, and it affords undesirable pressure drop. Such a solution is unsatisfactory because it diminishes the efficiency of the overall system.

Another proposed solution has been to provide means for introducing a spray of solvent in the DT. Such a spray is typically located at a point where the vapors go into a duct which allows them to exit the DT. This solution has also proven to be unsatisfactory, however, since the solvent moistens the meal below. In consequence, energy waste occurs. Even further, however, such a solution has proven inefficient in accomplishing cleaning of the vapors.

Another proposed solution is to provide a water wash. As in the case of solvent cleaning, the water wash is positioned in the duct exiting the DT. Again, however, this solution has inherent problems. As in the case of solvent cleaning, unnecessary energy is expended.

It is to these deficiencies that the present invention is directed. The present invention incorporates a concept which allows cleaning of vapors from a DT of particulate matter before the vapors are conveyed to an evaporator.

SUMMARY OF THE INVENTION

The present invention is employed in a system for treating agricultural products. A typical process in which the invention comes into play is treating, for example, grain to remove the hulls thereof. The system with which the present invention is applicable for use has a desolventizer/toaster (DT) and an evaporator connected down flow of the DT by a conduit array. The system further includes a mist injection station in a segment of the conduit array extending downwardly at an acute angle from an egress port rising from an upper end of the DT. A generally vertically extending segment of the conduit array includes communication with an egress end of the segment of the conduit array which extends downwardly at an acute angle. A truncated conical section has a small diameter end in fluid communication with an egress end of the generally vertically extending segment, and an open, large diameter end is axially coextensive and coaxial with an expanded diameter conduit portion. In view of the structure employed, an annular plenum is defined within the expanded diameter conduit portion. A bridge section of the conduit array facilitates passage of fluid flow and particulate matter entrained therein from the annular plenum to the evaporator.

A wall, forming the truncated conical section, relative to an axis with respect to which the various components are defined is, it is intended, small. A preferred embodiment of the invention limits the angle to less than 20 degrees.

The present invention typically includes a mist injection station which can be located in the conduit array so as to employ the station to add chemicals to neutralize various deleterious effects. For example, it can be employed to add chemicals which neutralize the effects of corrosive acids, caustic chemicals, etc.

The product treatment system in accordance with the present invention can employ a truncated conical section which functions with the expandable diameter conduit portion as a cyclone. This allows the achievement of efficiency in the overall system.

The present invention is thus an apparatus for use in a system having a DT and an evaporator apparatus. More specific features of the invention and advantages achieved by those features will become apparent with reference to the detailed description, appended claims, and accompanying drawing FIGURE.

BRIEF DESCRIPTION OF THE DRAWING FIGURE

The FIGURE is a perspective view of a treatment system employing the present invention.

DETAILED DESCRIPTION OF THE INVENTION

Referring now to the drawing wherein like reference numerals denote like elements throughout, the FIGURE illustrates a system 10 for treating agricultural products that have, for example, been processed by using hexane or another solvent. Desolventizers/toasters (DT) are used to recover the solvent and revive the agricultural product.

The FIGURE illustrates a desolventizer/toaster (DT) 12 into which the product being recovered is received. The DT 12 is, in essence, at one end of the process, and an evaporator 14 is at the other end. In between the two is a conduit array 16 through which products are conveyed.

An embodiment of the present invention envisions use of a mist injection station 18. This station 18 is interposed within the conduit array 16 down flow of the DT 12. While other locations for placement of a mist injection station are contemplated, the FIGURE shows it posited in a segment of the conduit array 16 between the DT 12 and evaporator 14 which extends downwardly at an acute angle from an egress port 22 rising from an upper end 24 of the DT 12. It has been found that an angle of 45 degrees relative to the vertical is appropriate for purposes of the system in which the present invention operates.

As shown in the FIGURE, a generally vertically extending segment 26 of the conduit array 16 extends downwardly from an egress end 28 of the angled portion 20. The generally vertically extending segment 26 is in fluid communication with egress end 28 of the segment of the conduit array 16 extending downwardly at an acute angle, namely, angles first section 20.

The egress end 30 of the generally vertical second segment 26, in turn, communicates with a truncated conical section 34, which has a small diameter end 36 and a large diameter end 38, of a third conduit array segment 33. The small diameter end 36 is in fluid communication with an egress end 30 of the generally vertically extending second segment 26. The large diameter end 38 is axially coextensive and coaxial with an expanded diameter conduit portion 40 of the third conduit array segment 33. An annular plenum 42 is thereby defined within the expanded diameter conduit portion 40 between a wall defining that portion and the truncated conical section 34. A bridge section 44 of the conduit array 16 facilitates passage of fluid flow and particulate matter entrained therein from said annular plenum 42 to the evaporator 14.

As shown in the FIGURE, the product treatment system 10 in accordance with the invention can employ a truncated conical section which has a large diameter only slightly larger than the small diameter. The angle of the surface of the truncated conical section 34 relative to the expanded diameter conduit portion 40 will, therefore, be relatively small. It is submitted that the angle can be, in view of the other components of the system, less than 20 degrees.

It will be understood that the mist injection station 18 can serve multiple functions. It can function as a water wash 32 for the particulate material, or it can be employed for adding chemicals to neutralize the effects of corrosive acids and caustic chemicals.

Also, if desired, the truncated conical section 34 and the expanded diameter conduit portion 40 can function as a cyclone. Particulate matter can, therefore, more efficiently be removed.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A conduit array for operatively uniting an evaporator with a desolventizer/toaster (DT) in furtherance of scrubbing vapors from the DT in advance of passage of the vapors to the evaporator, the conduit array comprising:

a. a first conduit array segment for receipt of vapors from an egress port of the DT, said first conduit array segment downwardly extending from the egress port at an acute angle;

b. a second conduit array segment vertically extending from an egress portion of said first conduit array segment;

c. a third conduit array segment extending from an egress portion of said second conduit array segment, said third conduit array segment characterized by an expanded diameter conduit portion and a truncated conical section therein and axially coextensive and coaxial with same so as to delimit an annular plenum within said expanded diameter conduit portion, said truncated conical section having an ingress diameter end in fluid communication with said egress end of said second conduit array segment and an egress diameter end opposite said ingress diameter end, said ingress diameter end being less than said egress diameter end; and, d. a fourth conduit array segment for operatively uniting said third conduit array segment with the evaporator.

2. The conduit array of claim 1 wherein said first conduit array segment downwardly extends from the egress port at an angle of about 45 degrees.

3. The conduit array of claim 1 wherein an angle defined by a wall, forming said truncated conical section, relative to an axis with respect to which the various components are defined, is less than 20 degrees.

4. The conduit array of claim 1 further comprising a mist injection station interposed within a conduit array segment of either or both of said first conduit array segment and said second conduit array segment.

5. The conduit array of claim 4 wherein said first conduit array segment downwardly extends from the egress port at an angle of 45 degrees.

6. The conduit array of claim 5 wherein an angle defined by a wall, forming said truncated conical section, relative to an axis with respect to which the various components are defined, is less than 20 degrees.

* * * * *